Oct. 28, 1958 D. S. DERBAWKA 2,857,832
CULTIVATOR
Filed April 6, 1955 2 Sheets-Sheet 2
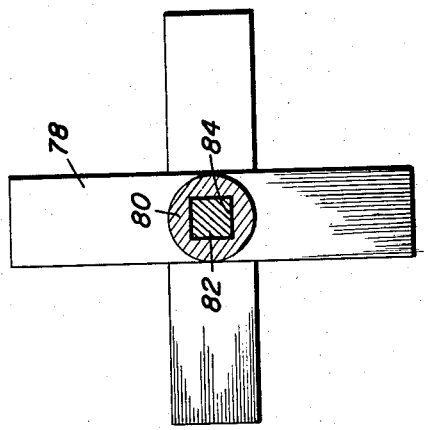
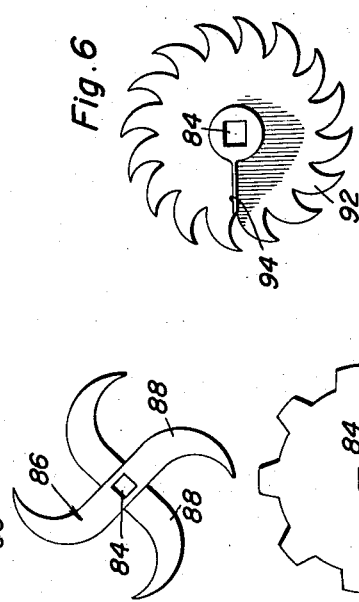
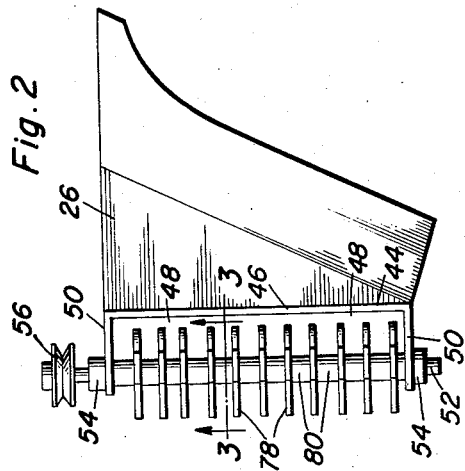
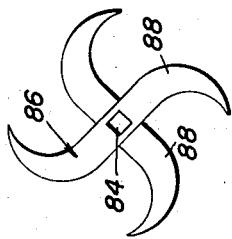
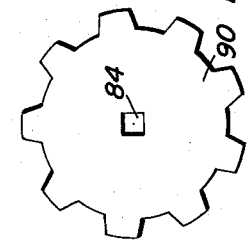
Dmytro S. Derbawka
INVENTOR.

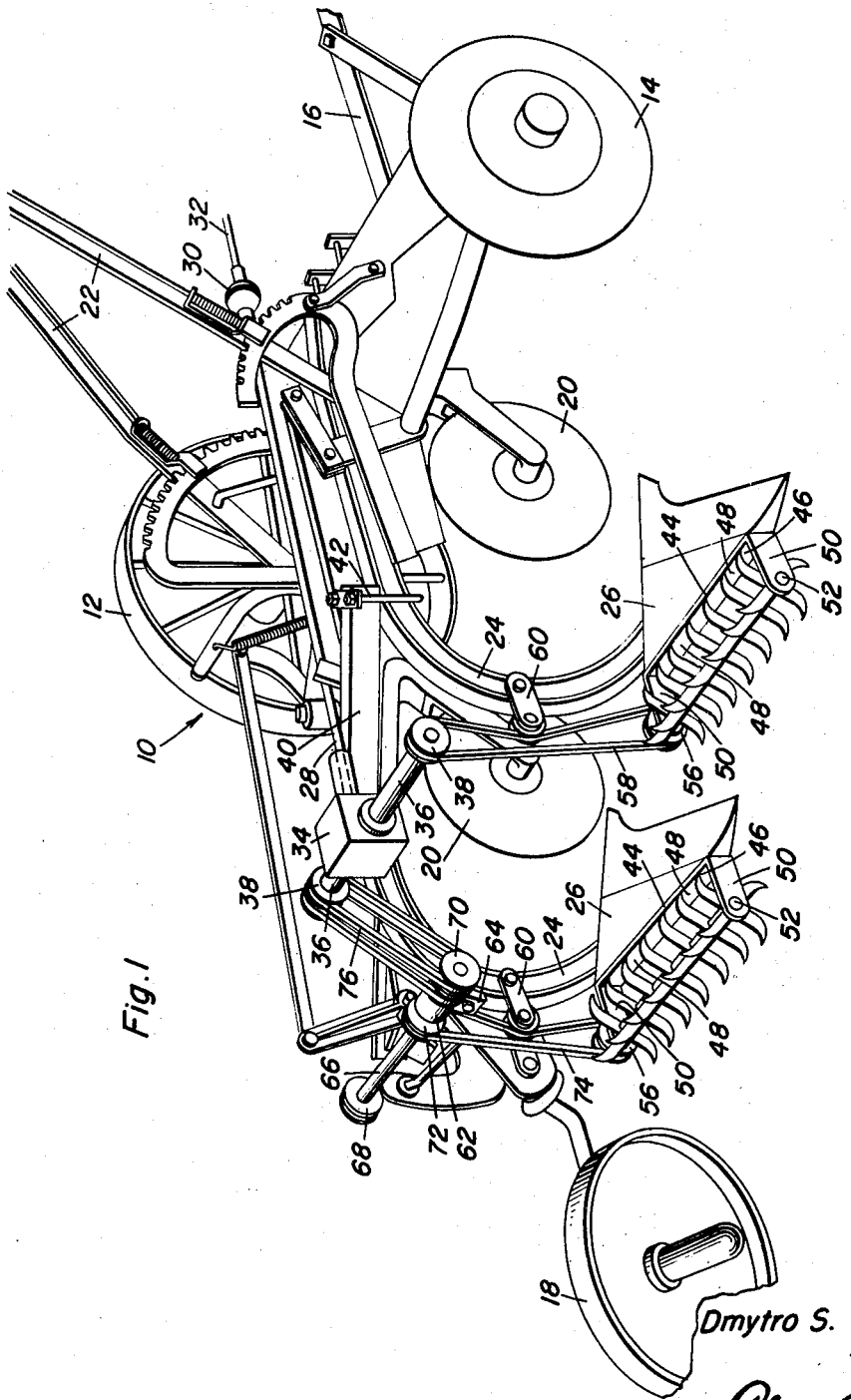

United States Patent Office 2,857,832
Patented Oct. 28, 1958

2,857,832

CULTIVATOR

Dmytro S. Derbawka, Borden, Saskatchewan, Canada

Application April 6, 1955, Serial No. 499,709

1 Claim. (Cl. 97—10)

This invention relates generally to an attachment to a standard plow beam, and is more particularly concerned in providing power-driven mechanism which will pulverize top soil and separate said soil from objectionable roots and weeds which are plowed up.

Another object of this invention is to provide a device which may be readily attached to a standard plow beam and positioned in operative relation thereto without interfering with the normal operation of the plow and its cooperating parts.

A further object of this invention is to provide a relatively inexpensive and highly efficient means to be attached to conventional plow beams for readily and expeditiously separating objectionable quackgrass, roots, etc. while pulverizing plowed up top soil and leaving it in good condition for future cultivation.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of a conventional tractor-drawn plow assembly showing the novel power-driven separating means of the invention;

Figure 2 is an enlarged plan view of a standard plow beam showing the attachment in position;

Figure 3 is an enlarged sectional view taken substantially on line 3—3 of Figure 2; and Figures 4–7 are alternate blade structures which may be used in treating different type soils.

Indicated at 10 is a conventional tractor-drawn plow including the usual support wheels 12 and 14, drawbar structure 16 to be connected to a tractor (not shown), a rear support wheel 18, disc colter blades 20, the conventional adjusting levers 22, and the usual plow beams 24 which have secured thereon in the usual manner the plow shares 26 with the conventional moldboards removed.

Drive shaft 28 is connected by means of a universal coupling 30 to a drive shaft 32 which will be connected to the conventional power take-off of a tractor, the other end of the drive shaft 28 having suitable gears secured thereon and encased in a gear casing 34, the gears within the casing 34 being intermeshed with suitable gearing for driving a rotating power shaft 36 which includes drive pulleys 38 on its outer ends. The gears within the gear case 34, though not shown, are of a conventional nature and, accordingly, further illustration is not believed to be necessary. The gear casing 34 may be rigidly secured in any suitable manner by means, for example, of the square beam element 40 which is rigidly secured to one of the plow beams 24 by means of conventional U-shackles 42.

Secured to the rear horizontal edge 44 of the plow shares 26 are U-shaped brackets 46, which are removably secured to the plow shares in the same manner as a removable moldboard; for example, by means of the screws 48. The U-shaped brackets include rearwardly extending support elements 50 which rotatably carry a rotatable shaft 52 journaled thereon in suitable bearings 54 which are attached to the support elements 50. Secured to the end of the shaft 52 is a pulley 56 which has journaled thereon a V-belt 58 which passes over the pulley 38 to be driven thereby, an intermediate portion of said belt 58 being in contact with a conventional belt tightener assembly 60 which is secured to a plow beam 24 in any suitable manner. In the event the drive pulley 38 is not located directly over the pulley 56 as seen on the right-hand portion of Figure 1, intermediate adapter pulleys are suitably mounted on the plow beams to take care of such an expedient. Accordingly, the support bearing structure 62 is shown as secured to another plow beam by means of a suitable bracket 64 and has journaled therein a driven shaft 66 which includes at the ends thereof driven pulleys 68 and 70. Although the pulleys 38 are indicated as both the single and double variety, they both accomplish the same purpose, the double pulleys being shown as merely an expedient for assuring a greater transmittal of power to compensate for any slippage between the driven belts and the pulleys. The shaft 66 includes an intermediate pulley 72 mounted thereon, which has a V-belt 74 journaled thereover and in engagement with the pulley 56, and includes, in contact with an intermediate portion thereof, a belt tightener 60. Journaled over the upper pulleys 38 and pulley 70 are double V-belts 76 for transmitting power in the usual manner. Although V-belts and pulleys are disclosed herein for transmitting power from the drive shafts, it is to be considered within the purview of this invention that chain drives and gears may be used to provide a more positive transmittal of power.

As will be noted in Figure 2, the shaft 50 has secured thereon a plurality of power-driven blades 78 having spacers 80 interposed therebetween. As seen in Figure 3, the shaft portion of shaft 52 retained between the support elements 50 is a square cross-section as indicated at 82 cooperating with the square recess 84 in the blade 78.

Blade 78 may consist of an integral cross shaped member or two separate rectangular elements positioned at 90° with respect to each other. The blade identified by reference character 78 is the type which could be used with stony or gravelly soil, having a blunt and sturdy edge for attacking said soil as they pass up above the plow share and over the edge 44 thereof. It will be noted that the spacers 80 permit the loose soil to drop therebetween wherein the gravel and stones would be, to some extent, left deposited on the top of the soil.

Figure 4 illustrates a blade 86 which includes curved blades 88 which may be of two separate sections or a single integral blade structure, as mentioned above, this blade being used in relatively light black loam. Blades 90 and 92 disclose blades to be used in heavy gumbo soil, blade 92 including a radially slotted portion 94 for preventing excessive strain on the blade. Any of the previously described blades may be used in combination with other of the blades, depending on the consistency of the soil being worked. The soil working structure disclosed in Figure 7 may be described as a coiled blade 96 which has sharpened teeth 98 on the outer periphery of the coil and includes stub shafts 100 which may have mounted thereon a suitable drive pulley or drive gear as described in connection with Figures 1 and 2.

It will be noted that all of the blades which will be mounted on the shafts 52 include the common feature of having a spacing which permits the top soil passing over the top of the plow share 26 and its rear edge 44 to drop therethrough wherein the grass roots, stones, etc. are subsequently deposited on the top of the top soil as the plow is being towed along the ground surface.

The gears contained in the gear casing 34 are designed to provide a suitable speed to the shaft 52, depending upon the speed at which the plow is being towed. Although the device is indicated as being power driven from the power take-off of the towing vehicle, it could readily be driven from one of the land wheels of the plow in a manner well known in the art.

The operation of the attachment is believed to be apparent. However, the operation will be briefly set forth as follows:

The earth passing over the plow share 26 flows rearwardly over the rear edge 44 and toward the bracket 46 which is on the same level as the edge 44. The power-driven shaft 52 which is carried by the U-shaped bracket 46 may be rotated in either a clockwise or counterclockwise direction, depending upon the type of soil being treated; i. e., in the event it is rocky soil or gravelly soil is being treated, and the cutters 78 are being used, the shaft 52 could be rotated counterclockwise, permitting the loose top soil to pass therebetween, and more or less throwing the rocks and heavy travel to the rear of the plow share on the previously deposited top soil.

Thus, there has been disclosed a relatively simple and trouble-free attachment means for standard plow beams which may be utilized with a plow having any number of plow shares, eliminating the necessity for obtaining separate equipment or cultivating structure of the character heretofore disclosed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a plow including a pair of side-by-side plow beams, plowshares on said beams having horizontal rear edges, a pair of rotary earth-working assemblies in the rear of said edges having laterally spaced horizontal shafts, horizontal brackets on said rear edges supporting said shafts and spacing said assemblies in the rear of said plowshares, a support member mounted horizontally on one beam above said assemblies and extending between said beams, a transverse power shaft above said beams, a gear casing mounting said power shaft intermediate its ends on said support member for power drive of said shaft and with the ends of the power shaft free, and flexible drives operatively connecting the free ends of said power shaft with said horizontal shafts.

References Cited in the file of this patent

UNITED STATES PATENTS

| | | |
|---|---|---|
| 314,609 | Schenck | Mar. 31, 1885 |
| 1,113,684 | Phillips | Oct. 13, 1914 |
| 1,395,370 | Tate | Nov. 1, 1921 |
| 1,795,182 | Ross | Mar. 3, 1931 |
| 2,244,538 | Kasten | June 3, 1941 |
| 2,711,125 | Szymczak | June 21, 1955 |
| 2,747,490 | Brown | May 29, 1956 |